UNITED STATES PATENT OFFICE.

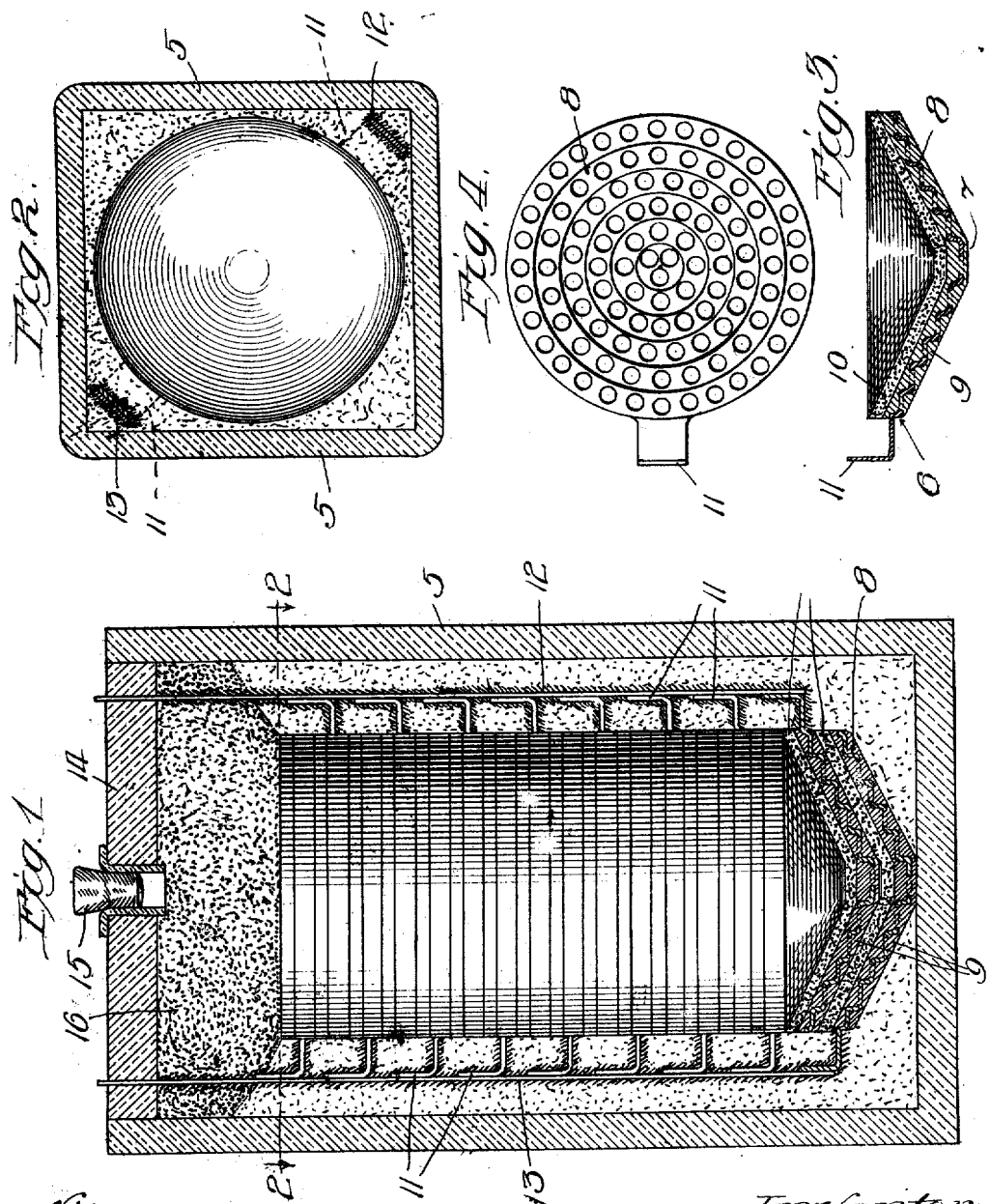

JULIUS BECKER, OF CHICAGO, ILLINOIS.

DRY SECONDARY CELL.

1,273,447.  Specification of Letters Patent. Patented July 23, 1918.

Application filed March 29, 1917. Serial No. 158,335.

*To all whom it may concern:*

Be it known that I, JULIUS BECKER, a citizen of the Swiss Confederation, residing at Chicago, in the county of Cook and State of Illinois, have invented certain new and useful Improvements in Dry Secondary Cells, of which the following is a specification.

The present invention has to do with certain improvements in dry secondary cells and the like; that is, secondary cells in which the electrolyte is absorbed or carried by a suitable absorbent material, such as plaster of Paris, or gypsum, glass wool, and the like. Such a cell is to be distinguished from one in which the electrolyte is perfectly fluid and free to flow under the influence of gravity.

One of the objects of this invention is to provide an arrangement of electrodes and separators or separating material, such that the electrolyte will be most fully and perfectly presented to and brought into contact with the surfaces of the electrodes, notwithstanding the fact that the electrolyte is absorbed into or carried by a suitable absorbent material, such as those above mentioned.

Another object of the invention is to so design and relate the electrodes and separators that they can be very compactly assembled into a very small space. This will enable the construction of cells of relatively small size, having nevertheless a relatively high ampere-hour capacity, and will make it possible to use the storage cells in many classes of service from which they are now more or less excluded.

Another object of the invention has to do with the provision of a cell in which the electrodes lie in horizontal position. With this arrangement, any gas generated during the operation of the cell will rise, and would collect on the under surface of the next higher electrode. If the said electrode were to be perfectly flat and horizontal, the gas thus collected would remain in contact with the under surface of said electrode until eventually a sufficient amount of gas had collected to completely polarize the cell.

Another object of the invention is to so form and relate the electrodes to each other that the gas will readily shed or flow away from the electrodes, notwithstanding the fact that the said electrodes lie in substantially horizontal position.

Another feature of the invention has to do with the manner in which the electrodes are related to the separators, and in this connection an object is to provide a unitary electrode and separator, so that when a number of such unitary structures are set together, the proper relationship between electrodes and separators will be established.

Other objects and uses of the invention will appear from a detailed description of the same, which consists in the features of construction and combinations of parts hereinafter described and claimed.

Referring to the drawing:

Figure 1 shows a vertical cross section through a completed cell embodying the features of the present invention, Fig. 1 being a section taken diagonally through the cell from one corner to the other; the two lowermost electrodes are shown in cross section, whereas the remaining electrodes and separators are shown in elevation;

Fig. 2 shows a horizontal section taken on line 2—2 of Fig. 1, looking in the direction of the arrows;

Fig. 3 shows a vertical cross section through one of the unitary electrodes and separators; and Fig. 4 shows a plan view of one of the electrode plates before the active material has been applied thereto.

The construction to which the present invention relates is illustrated as being applied to a cell including a rectangular casing or container 5. This is done largely as a matter of convenience, although it will appear that a casing of this shape is very well adapted for containing the electrodes and separators herein disclosed.

Each electrode is in the form of a circular dish or pan tapering from its outer edge 6 to its inner portion 7. These electrodes are conveniently made up from the circular lead plates 8, such as shown in Fig. 4, to which is applied the active material 9. The plates 8 are conveniently formed with a series of regularly depressing or descending steps, as well illustrated in Figs. 1 and 3, said steps being provided with perforations, as best shown in Fig. 4. When the active material has been applied to the plate and formed up, the upper and lower surfaces of the plate are smooth or of regular contour, so that the upper and lower surfaces of the completed electrode are of conical form.

Between the consecutive electrodes there are located the dish-shaped separators 10, a best shown in Fig. 1. These separators naturally correspond in number to the number of electrodes. Said separators are conveniently made from plaster of Paris or gypsum or any other suitable separating material having a porous nature, so that the electrolyte will be absorbed thereinto and thus be brought into contact with the surfaces of the electrodes and be enabled to circulate to a greater or less extent after the lapse of a considerable period of time. These separators may either be formed integrally with the electrodes or as separate elements.

As a matter of convenience, I prefer to form a layer of separating material on one surface of each electrode, as shown more in detail in Fig. 3. Such separator may be of any desired material, but preferably a material which will adhere with sufficient firmness to the material of the electrode to virtually become an integral part thereof. Such, for example, may be plaster of Paris or gypsum.

Each electrode is provided with a sidewise extending lug or projection 11, as shown in Fig. 4. When the electrodes and separators are assembled together, they are so placed that the lugs of alternate electrodes lie in alinement, as shown in Fig. 1. This being the case, the terminal straps 12 and 13 may be welded or soldered to the proper electrodes, as shown more particularly in Fig. 1. The lugs 11, with the terminal straps attached thereto, necessarily project beyond the peripheries of the electrodes themselves. The square or rectangular form of container is a very desirable one to use, because the lugs and terminal straps are conveniently accommodated in the corners of the containers, as shown in Fig. 2.

After the electrodes and separators have been assembled and the proper lugs joined together, they may be all set down into the container, and then the corner portions and any unoccupied portions of the container may be filled in with plastic material containing electrolyte, so as to fill up the entire body of the container.

I wish to point out particularly the very great desirability of the construction herein disclosed for certain classes of use, such, for example, as for use in connection with conductors' signal lamps and the like. These lamps have to be swung and thrown about, and it is therefore impossible to make satisfactory use of a liquid electrolyte battery or cell. With a secondary dry cell of the type herein disclosed, however, there is no danger of spilling the electrolyte when the cell is swung about.

Furthermore, by packing the electrodes and separators solidly together in the manner herein disclosed, it is impossible for the electrodes to shed any material, and therefore danger of short-circuiting is eliminated, and the life of the active material is greatly increased. All of these results are secured in combination with an arrangement in which the gas will be readily shed or allowed to work its way upward on account of the conical surfaces of the electrodes.

I wish to point out the fact that the use of inclined lower surfaces on the electrodes enables them to shed any gases which may be generated. It is not necessary that said lower surfaces be circular, but I contemplate within the scope of my invention any electrode arrangement in which the lower surface of the electrode is inclined so as to shed the gas.

The upper portion of the container may be closed in any suitable manner. A simple form of closure, however, comprises a layer of asphaltum or the like 14, through which the terminal straps 12 and 13, or other connectors, are extended. When desired, a vent tube 15 may be provided in the closure, said vent tube also serving as a convenient means for introducing water from time to time, if desired.

I have discovered the fact that if a layer of granulated manganese dioxid be interposed between the upper portion of the active material and the asphaltum closure, the gas rising from all portions of the cell will find its way to the vent through the pores or openings of said layer.

Furthermore, the hydrogen of the gas will combine with the oxygen of the manganese to form water, and thus deoxidize the manganese. Such a layer of manganese dioxid I have illustrated at 16 in Fig. 1.

It is to be observed that the terminal straps 12 and 13, and the lugs 11, are so located that under ordinary circumstances they would be exposed to the action of the electrolyte. Consequently, if no precautions should be taken, these parts would be liable to "form" when the cell was charged and discharged, thereby rendering them brittle and also reducing their conductively. In order to guard against this action, I may coat the said portions with a suitable acidproof insulating compound 17, so as to protect the said parts from the action of the electrolyte.

While I have shown and described an arrangement which include circular electrodes and a rectangular container, still I am not limited to this arrangement inasmuch as certain of the features of the invention can manifestly be used to equal advantage with other shapes of electrode and container, such, for example, as a rectangular electrode, or an oblong electrode, or a circular container.

I claim:

1. In a secondary cell, the combination with a square container, of an active element within the same, said active element comprising a plurality of cone shaped electrodes and intermediate cone shaped separators, all of circular contour and having their concave faces upturned, the electrodes and separators being consecutively in solid contact with each other to provide a solid structure, suitable porous material surrounding the active element and filling the remaining portions of the container, the separators being of acid absorbent but acid resisting material, and electrically insulating, terminal straps in diametrically opposite corners of the container, each strap being connected to all of the electrodes of its polarity, electrolyte in the separators and the porous material, a layer of acid resisting nonconducting material on each terminal strap, and manganeses dioxid in the upper portion of the container and above the active element, substantially as and for the purpose set forth.

2. In a secondary cell, the combination with a container of an active element within the same, said active element comprising a plurality of cone shaped electrodes and intermediate cone shaped separators, all of circular contour and having their concave faces upturned, the electrodes and separators being consecutively in solid contact with each other to provide a solid structure, the separators being of acid absorbent but acid resisting material, and electrically insulating, terminal straps connected to the electrodes of similar polarity, electrolyte in the separators, and manganese dioxid in the upper portion of the container, substantially as and for the purpose set forth.

3. In a secondary cell, the combination with a container, of an active element within the same, said active element comprising a solid structure composed of alternating cone shaped electrodes and cone shaped separators in solid engagement with each other, and having their concave faces upturned, the separators being of electrically insulating, acid absorbing but acid resisting material, and electrolyte permeating the separators, substantially as and for the purpose specified.

4. In a secondary cell, the combination with a container, of an active element within the same, said active element comprising alternating cone shaped electrodes and cone shaped separators of electrically insulating, acid absorbing but acid resisting material, the concave faces of the electrodes and separators being upward, electrolyte permeating the separators, and manganese dioxid in the upper portion of the container, substantially as and for the purpose specified.

5. In a secondary cell, the combination with a container, of an active element within the same, said active element comprising alternating cone shaped electrodes and cone shaped separators, all having their concave faces upturned, the separators being of electrically insulating, acid absorbing but acid resisting material, and electrolyte permeating the separators, substantially as and for the purpose set forth.

JULIUS BECKER.